W. M. SIMPSON.
Bee Hive.
No. 77,222.
Patented April 28, 1868.
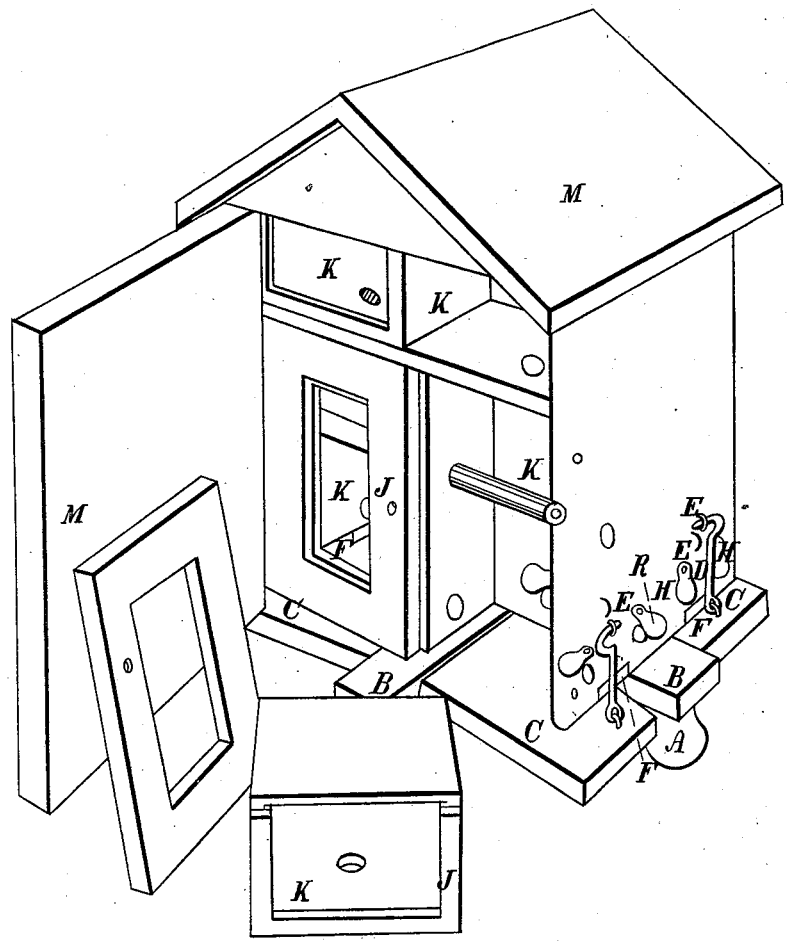

United States Patent Office.

WILLIAM M. SIMPSON, OF DAVISBURG, MICHIGAN.

Letters Patent No. 77,222, dated April 28, 1868.

IMPROVEMENT IN BEE-HOUSES AND HIVES.

*The Schedule referred to in these Letters Patent and making part of the same.*

TO WHOM IT MAY CONCERN:

Be it known that I, WILLIAM M. SIMPSON, of Davisburg, in the county of Wayne, and State of Michigan, have invented a new and useful Improvement in a Bee-House and Hive; and I do declare that the following is a true and accurate description thereof, reference being had to the accompanying drawings, and to the letters of reference marked thereon, and being a part of this specification.

The drawing represents the invention partially in section.

The nature of this invention consists in so arranging a series of bee-hives in one house divided into proper compartments, so that each compartment is a separate hive, provided with proper openings from one to the other, which may be closed at pleasure; also provided at the top of each compartment or hive with the ordinary honey-boxes. These compartments are so arranged that while the bees are working in one, the others are closed. When they have filled the first hive, or have multiplied to such an extent as to render it necessary to swarm, the bees may be admitted to another compartment, and so on until all are filled, thereby preventing the necessity and possible loss attendant upon swarming, or the necessity of killing the bees to obtain the honey. These compartments are also provided with separate bottoms or floors, which are hinged at or near the centre of the house in such a manner that their outer ends may be dropped, so that the floor will assume an inclined position, and allow the hive to be cleaned when necessary. In the outer walls of the various compartments are placed suitable openings, covered with gauze for the admission of air and exclusion of moths, and other proper openings and covers for the ingress and egress of the bees. Whenever it is desired to "take up" a hive, and remove the honey, the front of the hive, which is provided with a window, may be loosened by means of screws which attach it to the walls, and the honey removed without destroying the bees.

Having thus set forth the objects, I will now describe the construction of the invention, and name its various parts.

A are proper posts, which sustain the whole, inserted into or upon which rest the bars B, which cross each other at right angles. C are bottoms or floors, hinged at their inner ends to one of the bars B, while their outer ends are held in position by suitable hooks, D, and staples, E. F are openings for the admission of air, and covered with gauze for the exclusion of moths. G are other openings, provided with vibrating-covers, H, to furnish means of ingress and egress for the bees, which may be closed at pleasure. J are the fronts of the hives, provided with windows, through which the work of the bees may be examined. One of these fronts is left off in the drawings. The various compartments are provided with openings and vibrating-covers, similar to G H, which furnish the means of communication between the hives, and which may be opened or closed whenever necessary. There is nothing in the interior construction of the hives that differs much from many others. They are provided with proper openings in their tops, to correspond with similar openings in the bottom of the honey-boxes, K, which are also provided with glass fronts. The house is constructed with two partitions, resting upon bars B, at right angles with each other, and extend to the bottom of the honey-boxes K, from the bars B, and from the four walls of the house to a common centre, thus dividing the house into four compartments, each of which forms a hive. L are doors at each end of the house, which can be closed when necessary, and the whole is surmounted by a proper roof, M.

What I claim as my invention, and desire to secure by Letters Patent, is—

The construction of a bee-house and hives combined, when constructed, arranged, and operating substantially as and for the purposes hereinbefore described.

WILLIAM M. SIMPSON.

Witnesses:
H. S. SPRAGUE,
J. W. HOUGHTELIN.